US008019049B2

(12) United States Patent
Allen, Jr. et al.

(10) Patent No.: US 8,019,049 B2
(45) Date of Patent: Sep. 13, 2011

(54) METHOD FOR GENERATING RELIABILITY TESTS BASED ON ORTHOGONAL ARRAYS AND FIELD DATA

(75) Inventors: James J. Allen, Jr., Red bank, NJ (US); Janet Kenny, Wall, NJ (US); John Yeager, Lawrenceville, NJ (US); Muharrem Umit Uyar, Holmdel, NJ (US); Linda Yeager, Lawrenceville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1204 days.

(21) Appl. No.: 11/691,665

(22) Filed: Mar. 27, 2007

(65) Prior Publication Data

US 2008/0240369 A1 Oct. 2, 2008

(51) Int. Cl.
*H04M 1/24* (2006.01)
*H04M 3/08* (2006.01)
*H04M 3/22* (2006.01)

(52) U.S. Cl. .......... 379/10.01; 379/1.01; 379/10.03; 379/27.04; 702/108; 702/120; 702/123; 714/32; 714/738

(58) Field of Classification Search .......... 379/1.01, 379/9, 10.01, 10.03, 15.01, 23, 24, 27.01, 379/27.02, 29.01, 29.09, 31, 27.04, 27.03; 702/117, 118, 119, 120, 122, 123, 108; 714/25, 714/32, 33, 738, 741, 742
See application file for complete search history.

(56) References Cited

U.S. PATENT DOCUMENTS

| | | | | |
|---|---|---|---|---|
| 5,159,600 A | * | 10/1992 | Chintapalli et al. | 714/738 |
| 5,542,043 A | * | 7/1996 | Cohen et al. | 714/32 |
| 5,831,995 A | * | 11/1998 | Brown et al. | 714/738 |
| 5,987,633 A | * | 11/1999 | Newman et al. | 714/712 |
| 6,011,830 A | * | 1/2000 | Sasin et al. | 379/10.03 |
| 6,577,982 B1 | * | 6/2003 | Erb | 702/120 |
| 6,604,092 B1 | | 8/2003 | Stewart | |
| 2003/0233600 A1 | * | 12/2003 | Hartman et al. | 714/32 |
| 2006/0010426 A1 | * | 1/2006 | Lewis et al. | 717/124 |
| 2007/0011484 A1 | | 1/2007 | Chriss et al. | |

OTHER PUBLICATIONS

Madhav S. Phadke, "Quality Engineering Using Robust Design," ©1989 by AT&T Bell Laboratories, P T R Prentice Hall, Englewood Cliffs, New Jersey 07632; ISBN 0-13-745167-9; pp. 41-47, 149-211 and 285-319.

M.A. Fecko et al., "A success story of formal description techniques: Estelle specification and test generation for MIL-STD 188-220," Computer Communications 23 (2000), Elsevier Science B.V.; pp. 1196-1213.

Brochure "Telcordia™ Efficient Test Case Generation Service," Copyright ©2000 Telcordia Technologies Inc. (4 pages).

(Continued)

*Primary Examiner* — Binh Tieu
(74) *Attorney, Agent, or Firm* — Muncy, Geissler, Olds & Lowe, PLLC

(57) ABSTRACT

A method for generating reliability tests for a telephone system is based upon sampling an orthogonal array which covers various combinations of test parameters. Field data is collected of actual telephone activity on a telephone system. The field data is evaluated so as to determine call-mix characteristics. Probabilistic weights for the different call-mix characteristics are obtained, and then the probabilistic weights are used to sample the test case scenarios generated in the orthogonal array which have the same call-mix characteristics. These test case scenarios are used to run tests on the telephone system. These tests are preferably performed using automated test scripts. After the test data is collected, reliability metrics are calculated from the test data.

30 Claims, 5 Drawing Sheets

OTHER PUBLICATIONS

Philip R. Bevington, "Data Reduction and Error Annalysis for the Physical Sciences," Copyright ©1969 by McGraw-Hill, Inc.; pp. 186-203.

Harold J. Larson, "Introduction to Probability Theory and Statistical Inference," Third Edition; Copyright ©1969, 1974, 1982, by John Wiley & Sons, Inc.; ISBN 0-471-05909-9; pp. 382-395.

* cited by examiner

300

| TEST CASE | SCENARIO | TYPE | DURATION |
|---|---|---|---|
| ... | | | |
| 128 | 3 | P2P | 16 MIN |
| 129 | 1 | IDLE | 16 MIN |
| 130 | 7 | P2P | 1 MIN |
| 131 | 10 | CONF | 16 MIN |
| 132 | 11 | HOLD | 4 MIN |
| 133 | 17 | P2P | 4 MIN |
| 134 | 3 | IDLE | 64 MIN |
| 135 | 19 | P2P | 64 MIN |
| 136 | 7 | TRANS | 2 MIN |
| 137 | 4 | IDLE | 4 MIN |
| ... | | | |

*FIG. 3*

METHOD FOR GENERATING RELIABILITY TESTS BASED ON ORTHOGONAL ARRAYS AND FIELD DATA

BACKGROUND OF THE INVENTION

1. Field of the Invention

The present invention relates to a method for testing the reliability of telephone systems, and more particularly to a reliability testing method which is based upon orthogonal arrays and customer field data.

2. Description of the Relevant Art

Modern telephones are software controlled devices that are used in many different environments, such as call centers, investment banking firms, law firms, etc. The same telephone device is typically not used in the same way in different environments. In other words, an investment banker does not use a telephone in the same way that an operator in a call center uses the same telephone. Moreover, each telephone can be in a different state depending upon a particular call being initiated or received. For example, a telephone can be involved in a point-to-point ("p2p") call or a conference call, or it can be on hold, or it can be transferred from one caller to another, or it can be idle, etc. Additionally, the state of the telephone can vary depending upon whether the telephone is being used to initiate a call or whether it is being used to receive a call. When all the possible states for an individual telephone device are considered, it is possible that a telephone can literally be placed in millions of different states.

Since a telephone can be placed in so many different states, it is very likely that some of these states may cause the telephone to lock up or fail due to a software programming error. When a software controlled telephone locks up, it can usually be reset by disconnecting the telephone from the network, thereby removing electrical power from the telephone. If the failure or lock up is caused by the telephone being moved into a particular state, it is important to discover which state caused the failure and to correct the software.

In the prior art, reliability tests for software controlled telephone systems are usually based upon random test generation (operational profiles), but these random tests do not guarantee that "good" or "effective" combinations of test parameters are chosen. Hence, the prior art reliability tests do not yield a fast solution that converges to a mean-time-to-failure solution with a given confidence factor. It is known in the prior art to use orthogonal arrays for testing, however, the orthogonal arrays of the prior art only provide all pair-wise combinations of test parameters, which are typically used to replace exhaustive system tests. For example, these orthogonal array techniques may be based on the so-called Taguchi method, which can reduce the number of combinations of test parameters. But the selection of the test parameters are typically arbitrary and do not reflect realistic system usage in a particular environment. For example, financial institutions where there are many long conference calls versus call switch centers where there are many short calls that are transferred to other numbers are some examples of different operational environments for telephones.

An example of the Taguchi method is described in U.S. Pat. No. 6,604,092, by Steward, entitled, "Expert system utilizing a knowledge base and design of experiment (DOE) techniques". Although the Taguchi method is a powerful tool for testing software and other systems, the use of the Taguchi method and orthogonal matrices alone cannot provide an acceptable solution for the reliability testing of telephone systems, because a telephone has too many possible states that vary widely from one environment to the next. There are simply too many combinations of test parameters to effectively test the telephone for reliability in each environment in which it is expected to be used.

SUMMARY OF THE INVENTION

In the present invention, two techniques are merged to assure an effective combination of test parameters. By using an orthogonal matrix and field data, mean-time-to-failure and other reliability statistics can be effectively computed.

The goal of the present invention, therefore, is to generate reliability tests for telephone systems using complex software implementations such as telephone devices implemented using Session Initiation Protocol (SIP) for Voice-over-IP services, as described by Rosenberg, J., Schulzrinne, H., Camarillo, G., Johnston, A., Peterson, J., Sparks, R., Handley, M. and E. Schooler, "SIP: Session Initiation Protocol", IETF RFC 3261, June 2002, (hereinafter referred to as "Rosenberg"). Other complex software implementations include H.323 protocol for packet-based multimedia communication systems, as described in ITU-T Recommendation H.323, "Packet-based Multimedia Communication Systems," 2006. The reliability tests of the present invention include a number of advantages over the prior art. The reliability tests of the present invention are effective, because they are designed such that they not only mimic/resemble the field data collected from various sources, but they also stress the telephones so that good reliability metrics can be obtained. The reliability tests of the present invention are efficient, since they converge to well-known statistical metrics by making use of realistic data collected from an operational environment. The reliability tests are reusable, since they can be applied to telephone systems by using commercially available test application tools (see for example Test Complete Tool developed by Automated QA, 6000. South Eastern Avenue Suite 14-M, Las Vegas, Nev. 89119, hereinafter referred to as "Test Complete Tool"). The reliability tests are repeatable and re-generate certain failure scenarios where possible since most test systems where the reliability tests to be run will have error logging capabilities. Lastly, the reliability tests are remotely-executable, because they are executable from remote locations using tools such as PTI developed by Avaya and described in U.S. patent application Ser. No. 11/176,816, filed on Jul. 7, 2005, and entitled "Testing a data-processing system with telecommunications endpoints" or the Test Complete Tool from Automated QA.

The present invention utilizes an orthogonal array to gather combinations of test case parameters when randomly choosing test cases based on operational profiles/field data. At the heart of this is a process for generating a testing matrix which will be scheduled according to the operational profile of the product under test. This can be extended to produce a tool which automates such testing and/or a service by which one tests other companies' products or is used in testing a customer's end-to-end telephony system reliability. Finally, by choosing consistent operational data and testing matrices, multiple products can be compared side-by-side to get an "apples-to-apples" comparison of their reliability numbers (mean-time-to-failure, availability, etc).

BRIEF DESCRIPTION OF THE DRAWINGS

FIG. 3 illustrates a portion of an orthogonal matrix.

DESCRIPTION OF PREFERRED EMBODIMENTS

The state space is virtually infinite for covering all possible interactions that can happen in a telephone implementing complex software features (e.g., the telephones implementing SIP (See "Rosenberg") or H.323 services, as described in ITU-T Recommendation H.323, "Packet-based Multimedia Communication Systems," 2006.). One good approximation is using orthogonal arrays for testing all pair-wise combinations of different inputs. It has been shown in the literature that this approach which includes the Taguchi method, which is described in Phadke, M. S., "Quality Engineering Using Robust Design", Prentice Hall, 1989, though not exhaustive, is preferable to randomly generated test cases since the orthogonal array approach guarantees that all pairwise combinations of inputs are covered by the test cases.

If the test cases of the present invention were solely based on orthogonal arrays, the test cases would lack the so-called "commonly used scenarios" that users in the field tend to repeat more often than other input sequences. To produce reliability metrics that reflect the user behavior, the present invention, therefore, incorporates the field data statistics into the orthogonal array approach. This way, the test cases generated by the orthogonal array will be assigned probabilities based on the frequency with which they are observed in the field. Advantageously, the resulting test cases will both satisfy the orthogonality principle and resemble the field data.

Figure 1:
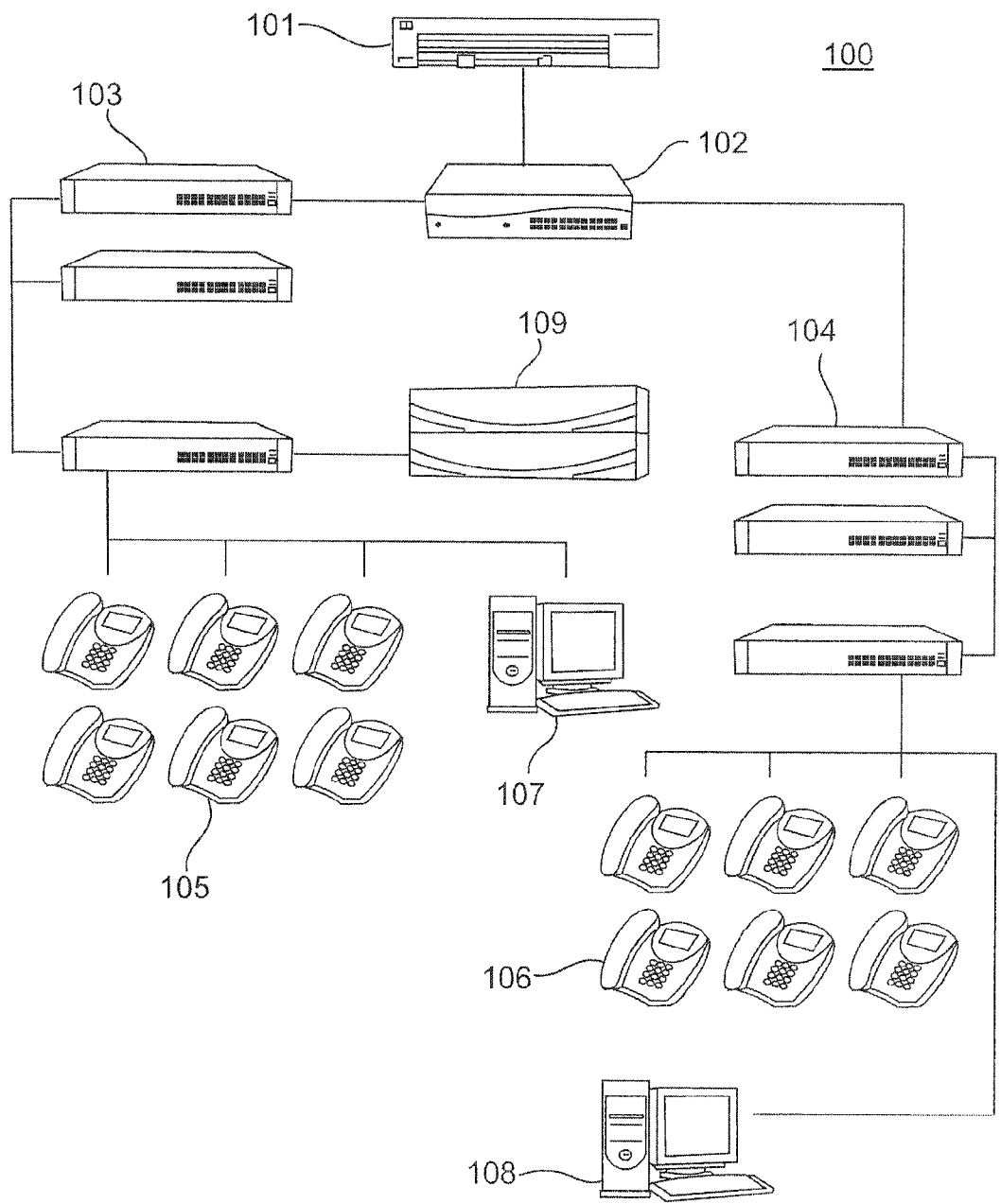
FIG. 1 illustrates a high level architecture for a reliability test laboratory associated with the present invention.

Referring now to FIG. 1, a high-level architecture of the reliability test lab 100 used to practice the method of the present invention is shown. Preferably, the test lab 100 includes a server 101 such as a Cisco 3640 server which is capable of supporting voice and data applications. The sever 101 is coupled to a switch 102 such as Avaya's Cajun 333R switch. The switch 102 is preferably coupled to a plurality of stackable switches 103, 104 such as Avaya's P333T stackable switch. The stackable switches 103 are preferably coupled to first telephone bank 105 which includes a relatively large number of telephones. Likewise, the stackable switches 104 are preferably coupled to second telephone bank 106 which also includes a relatively large number of telephones. The stackable switches 103 are also preferably coupled to a media server and gateway 109 such as the Avaya S8700/G650. The telephone banks 105, 106 are each respectively coupled to DHCP ("Dynamic Host Configuration Protocol") servers 107, 108.

In the reliability test lab 100, the number of telephones that should be used is in the order of dozens. The higher the number of telephones used in the lab, the faster the reliability statistics can be measured. Typically, fifty to one hundred telephones are used in the telephone industry due to space and maintenance constraints to implement each of the telephone banks of 105 and 106 of FIG. 1. The software tools to be utilized preferably include a test script development phase using tools such as PTI (See U.S. patent application Ser. No. 11/176,816) for telephone screen verification tools implementing Chinese postman tours to generate minimum-cost test sequences as described by Fecko M. A., Uyar M. U., Amer P. D., Sethi A. S., Dzik T., Menell R., McMahon M., "A Success Story of Formal Description Techniques: Estelle Specification and Test Generation for MIL-STD 188-220," Computer Communications, Special Issue on Formal Description Techniques in Practice, 23, pp. 1196-1213, 2000. This technique utilizes an orthogonal array generator to generate the test case selection template, and data analysis tools to obtain statistical data from the field (e.g., in a given week, percentage of calls that were point-to-point, conference, transfer, etc.).

Figure 2:
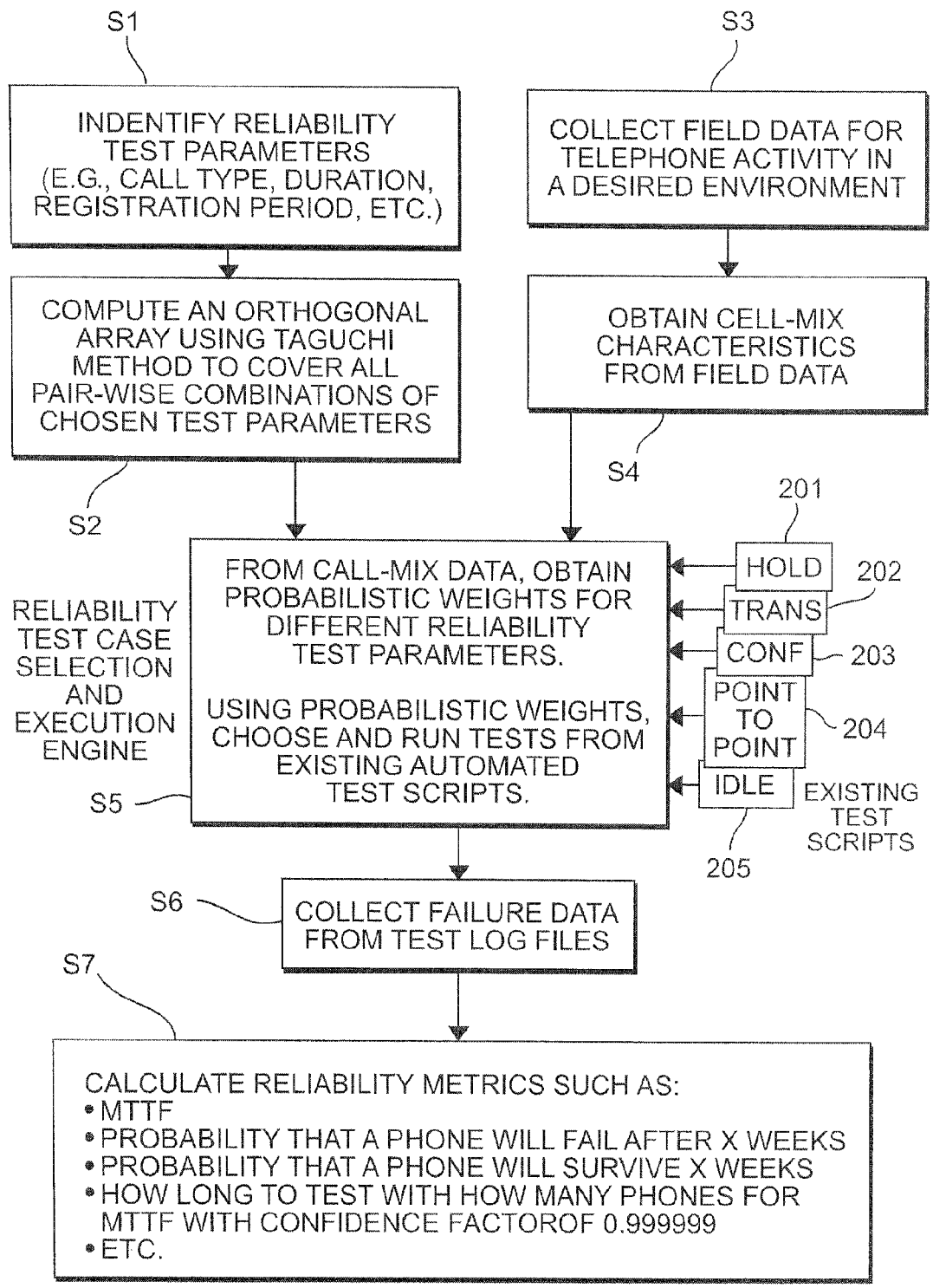
FIG. 2 illustrates a flow chart of the method of the present invention.

Referring now to FIG. 2, a flow chart illustrates the reliability testing method of the present invention. The reliability testing method includes seven steps.

In step S1, the reliability test parameters are identified, and these test parameters could include call type, duration, registration period or frequency, postman scenario number, etc. A registration period is often required by service providers to prevent the use of stolen telephones. Each telephone has to report its user name and password periodically to a registrar switch. This period can vary from minutes to days depending on the registrar operational options. In addition, based upon the field data, different parameters such as the length of a call being put on hold (for example, parameters called long_hold and short_hold to represent calls placed on hold for a long or short time, respectively) can be identified.

In step S2 an orthogonal array is generated using the Taguchi method to cover all pair-wise combinations of the chosen test parameters at step S1. The size of the orthogonal array is determined from the number of factors to be studied, the number of levels for each factor, etc. and selecting the appropriate sized array from published tables such as those found in Chapters 3 and 7 of Phadke, M. S., "Quality Engineering Using Robust Design", Prentice Hall, 1989. A partial representative example of an orthogonal array is illustrated in FIG. 3.

The example orthogonal array of FIG. 3 includes four columns and only a portion of the rows and columns which are applicable to each test case. In the first column the test cases are identified by a number, and in FIG. 3 only test cases 128 through 137 are illustrated. In the test lab, the test cases are executed in this sequential order. In the second column, a maximum of five different scenarios are identified. A description of a representative scenario is provided below. In the third column the type of connection is identified. In the example of FIG. 3 there are five different types of calls are identified: p2p (i.e., point-to-point calls where person A calls person B), conference (where three persons A, B and C establish a 3-way conference call among themselves), hold (where person A calls person B, and one of them put the call on hold), transfer (where person A calls B and transfers the call to person C), and idle (where the telephone is left idle without any incoming or outgoing calls). In the fourth column, different durations for the call types are provided. In addition to the three inputs in the second, third and fourth columns, other inputs, such as registration frequency, encryption type, transfer type, auto hold feature, etc., could be added to the orthogonal array. The number of inputs to be included in the calculation of an orthogonal array, and the types of inputs of the orthogonal array including scenarios, call types, and durations are determined by the test designer.

A representative description of the point-to-point call (i.e., p2p) scenarios for the orthogonal array of FIG. 3 will now be provided. In this example, there are three scenarios for p2p call types.

In scenario 1, person A calls person B; B answers; A and B talk and B hangs up (i.e., B disconnects the call).

In scenario 2, A calls B, before B answers A hangs up.

In scenario 3, B calls A; A answers, they talk and A hangs up.

It can be appreciated that many other scenarios for other call types can be generated from the field data.

In step S3 the field data is collected from a desired operational environment. The desired environment may be a call center, an investment bank, or a law firm, etc., and accordingly the field data will vary from one desired environment from another. For example, in a call center the duration of the calls may be relatively short and there may be numerous transfers among the employees of the call center. A call center operator, for example, may answer the call and then quickly transfer the caller to, for example, a sales or service representative. Whereas, in a law firm, for example, there may be frequent and relatively long conference calls with relatively few transfers.

Figure 4:
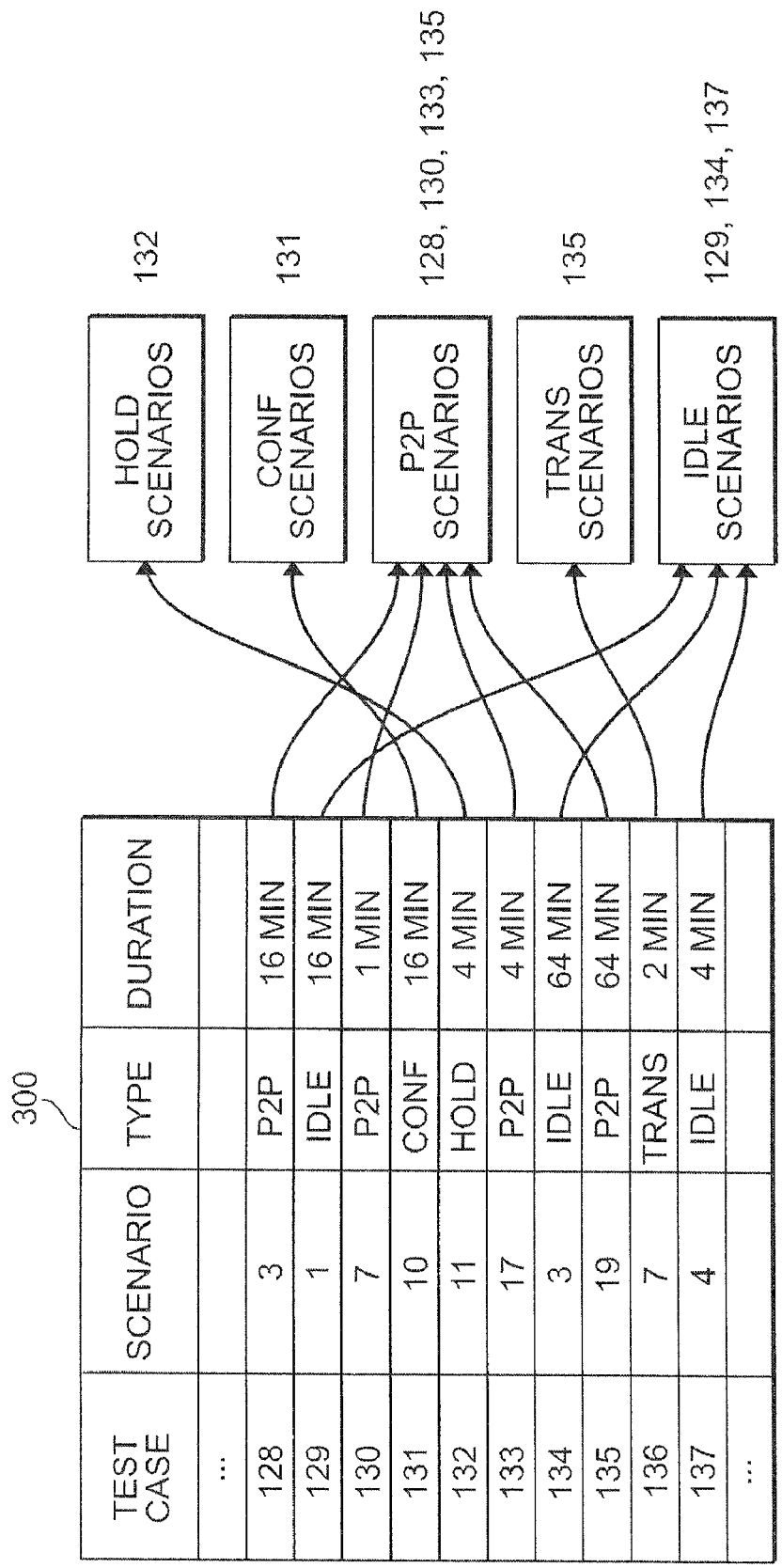
FIG. 4. illustrates the orthogonal matrix of FIG. 3 and related scenarios which are grouped together in buckets.

The orthogonal array generated test cases in step S2 can be envisioned such that they are grouped together in different "buckets" as illustrated in FIG. 4. In this illustration, the same call types will be placed together in the same bucket. The number of tests cases in each bucket will depend on the orthogonal array output size. For example, if there are six hundred (600) steps (or rows) in the orthogonal array output, there may be one hundred fifty (150) p2p type of steps, two hundred (200) hold type of steps, one hundred twenty (120) conference type of steps, etc. In the illustrated portion of the orthogonal array of FIG. 3, the one hold scenario (i.e., test case 132) is placed in the bucket for hold scenarios, the one conference scenario (test case 131) is placed in the bucket for conference scenarios, the three p2p scenarios (test cases 128, 130, 133, 135) are placed in the bucket for p2p scenarios, the one transfer scenario (test case 136) is placed in the bucket for transfer scenarios, and three idle scenarios (test cases 129, 134, 137) are placed in the bucket for idle scenarios.

Figure 5:
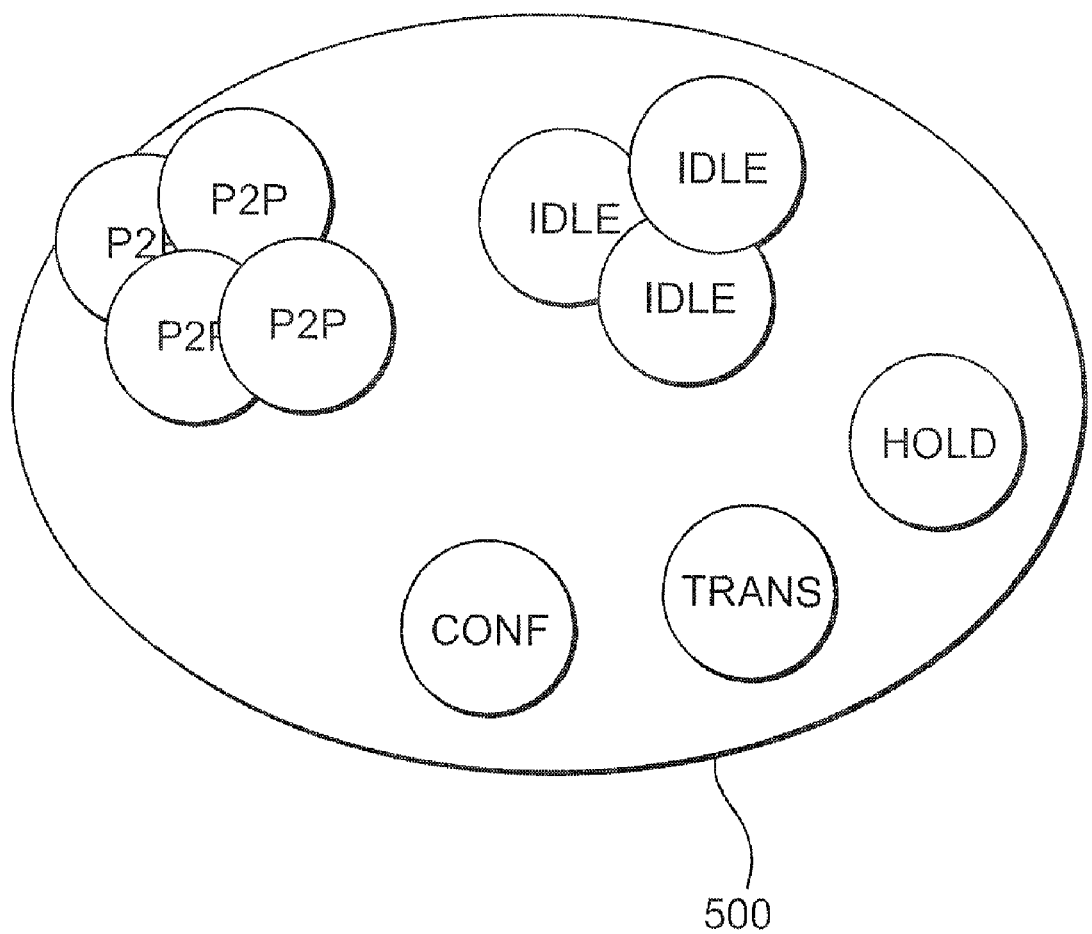
FIG. 5 illustrates a test selection engine which contains different call types.

In step S4, the percentage of test cases grouped by call type are determined from the field data in order to obtain call-mix characteristics from the field data. For example, in a desired environment at any given time a first percentage of the telephones may be idle, a second percentage may be involved in p2p calls, a third percentage may be involved in a conference call, a fourth percentage may be involved in a transfer, and a fifth percentage may be on hold. As illustrated in FIG. 5, each test case may be figuratively represented by a ball and placed in a selection test engine which is represented by the oval 500. It should be noted that, in this representation, the test selection engine 500 is analogous to a rotating lottery bin with numbered balls. From FIG. 5, it can be readily appreciated that 30% of the test cases involve idle telephones, 40% involve p2p calls, 10% involve holds, 10% involve transfers and 10% involve conference calls.

In step S5, probabilistic weights for the different reliability test parameters are obtained from the call-mix data of step S4. Using these probabilistic weights, existing automated test scripts 201-205 for different types of calls are randomly chosen and run. These existing automated test scripts 201-205 can be run for the following different types of calls: hold, transfer, conference, idle and p2p.

Referring again to FIG. 5, in reality, the test selection engine 500 is a suitably programmed digital computer that randomly selects the call type balls within each group in the test selection engine. Based upon the ball type, a test case generated from the orthogonal array is randomly selected from one of the five buckets of scenarios of FIG. 4. Once the ball is selected and the test case is performed in accordance with the appropriate test scripts 201-205, the ball is returned to the test selection engine 500. If the above described experiments are run long enough, eventually all the call types or balls from the test selection engine 500 with percentages close to the field data will have been performed. Moreover, substantially all of the orthogonal array scenarios from the scenario buckets of FIG. 4 will have been selected.

In step S6, failure data is collected from test log files generated in the performance of step S5. In other words, the actual failure data associated with the operation of telephone banks 105, 106 in performance of the experiments of step S5 are collected from the reliability test lab 100.

In step S7, different reliability metrics are calculated using the failure data collected in step S6. These metrics, or reliability test results, are aimed at answering important marketing concerns. A sample of such marketing issues include: (i) the probability that a telephone will fail after X weeks, (ii) the probability that a telephone will survive after X weeks, (iii) the probability that a telephone will operate without failure for x weeks, (iv) of the telephones that remain failure-free after first x weeks of operation, the probability that they will operate without failure for y weeks. (v) the mean time to failure ("MTTF"), (vi) the required duration of the tests until MTTF can be calculated with a confidence factor of 0.999999, and (vii) for a given number of telephones, the required duration of tests to calculate MTTF with a confidence factor of 0.999999. The techniques for calculating this type of data are well known in the art, and are described in text books such as Bevington, Philip R. "Data Reduction and Error Analysis for the Physical Sciences", McGraw-Hill Book Co., 1969, and Larson, Harold J., "Introduction to Probability Theory and Statistical Inference", John Wiley & Sons, 1982.

The invention has been described with reference to exemplary embodiments. However, it will be readily apparent to those skilled in the art that it is possible to embody the invention in specific forms other than those of the embodiments described above. This may be done without departing from the sprit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for generating reliability tests for telephone systems, comprising:
   generating an orthogonal array which includes test cases having combinations of test parameters;
   obtaining call characteristics from field data based upon actual telephone usage;
   obtaining probabilistic weights for different call characteristics based upon a frequency of occurrence in the field data;
   using the probabilistic weights to select desirable test cases from the orthogonal array;
   running tests on the telephone system using the selected desirable test cases;
   collecting test data from the tests that have been run; and
   calculating reliability metrics for the telephone system based on the test data.

2. The method according to claim 1 wherein the tests are run using automated test scripts.

3. The method according to claim 2 wherein the orthogonal array is generated using the Taguchi method.

4. The method according to claim 3 wherein the orthogonal array includes tests cases which include at least call types, scenarios, and durations.

5. The method according to claim 4 wherein the call types are selected from the group including a transfer, point-to-point, hold, conference, and others.

6. The method according to claim 5 wherein the test scripts are run for the different call types.

7. The method according to claim 1 wherein the reliability metrics are selected from the group including at least a mean time to failure, a mean time to failure with a predetermined confidence factor, the probability that a telephone will fail after a certain time period, and the probability that a telephone will survive for a certain time period.

8. The method according to claim 4 wherein the test cases of the orthogonal array are divided into groups by common characteristics and wherein a test case is randomly selected from one of the groups once the group is selected based upon its probabilistic weight as determined from the field data.

9. A computer program on a computer readable medium that generates reliability tests for telephone systems, comprising:
generating an orthogonal array which includes test cases having combinations of test parameters;
obtaining call characteristics from field data based upon actual telephone usage;
obtaining probabilistic weights for different call characteristics based upon a frequency of occurrence in the field data;
using the probabilistic weights to select desirable test cases from the orthogonal array;
running tests on the telephone system using the selected desirable test cases;
collecting test data from the tests that have been run; and
calculating reliability metrics for the telephone system based on the test data.

10. The computer program according to claim 9 wherein the tests are run using automated test scripts.

11. The computer program according to claim 10 wherein the orthogonal array is generated using the Taguchi method.

12. The computer program according to claim 11 wherein the orthogonal array includes tests cases which include at least call types, scenarios, and durations.

13. The computer program according to claim 12 wherein the call types are selected from the group including a transfer, p2p, hold, and conference.

14. The computer program according to claim 13 wherein the test scripts are run for the different call types.

15. The computer program according to claim 9 wherein the reliability metrics are selected from the group including at least a mean time to failure, a mean time to failure with a predetermined confidence factor, the probability that a telephone will fail after a certain time period, and the probability that a telephone will survive for a certain time period.

16. The computer program according to claim 12 wherein the test cases of the orthogonal array are divided into groups by common characteristics and wherein a test case is randomly selected from one of the groups once the group is selected based upon its probabilistic weight as determined from the field data.

17. A method for generating reliability tests for communication systems, comprising:
generating an orthogonal array which includes test cases having combinations of test parameters;
obtaining operational characteristics from field data based upon actual communication usage;
obtaining probabilistic weights for different operational characteristics based upon a frequency of occurrence in the field data;
using the probabilistic weights to select desirable test cases from the orthogonal array;
running tests on the communication system using the selected desirable test cases;
collecting test data from the tests that have been run; and
calculating reliability metrics for the communication system based on the test data.

18. The method according to claim 17 wherein the tests are run using automated test scripts.

19. The method according to claim 18 wherein the orthogonal array is generated using the Taguchi method.

20. The method according to claim 19 wherein the orthogonal array includes tests cases which include at least operational types, scenarios, and durations.

21. The method according to claim 20 wherein the test scripts are run for the different operational types.

22. The method according to claim 17 wherein the reliability metrics are selected from the group including at least a mean time to failure, a mean time to failure with a predetermined confidence factor, the probability that a communication will fail after a certain time period, and the probability that a communication device will survive for a certain time period.

23. The method according to claim 20 wherein the test cases of the orthogonal array are divided into groups by common characteristics and wherein a test case is randomly selected from one of the groups once the group is selected based upon its probabilistic weight as determined from the field data.

24. A computer program on a computer readable medium that generates reliability tests for communication systems, comprising:
generating an orthogonal array which includes test cases having combinations of test parameters;
obtaining operational characteristics from field data based upon actual communication usage;
obtaining probabilistic weights for different operational characteristics based upon a frequency of occurrence in the field data;
using the probabilistic weights to select desirable test cases from the orthogonal array;
running tests on the communication system using the selected desirable test cases;
collecting test data from the tests that have been run; and
calculating reliability metrics for the communication system based on the test data.

25. The computer program according to claim 24 wherein the tests are run using automated test scripts.

26. The computer program according to claim 25 wherein the orthogonal array is generated using the Taguchi method.

27. The computer program according to claim 26 wherein the orthogonal array includes tests cases which include at least operational types, scenarios, and durations.

28. The computer program according to claim 27 wherein the test scripts are run for the different operational types.

29. The computer program according to claim 26 wherein the reliability metrics are selected from the group including at least a mean time to failure, a mean time to failure with a predetermined confidence factor, the probability that a communication device will fail after a certain time period, and the probability that a communication device will survive for a certain time period.

30. The computer program according to claim 27 wherein the test cases of the orthogonal array are divided into groups by common characteristics and wherein a test case is randomly selected from one of the groups once the group is selected based upon its probabilistic weight as determined from the field data.

* * * * *